US010514257B2

(12) United States Patent
Onoe et al.

(10) Patent No.: US 10,514,257 B2
(45) Date of Patent: Dec. 24, 2019

(54) DETECTING DEVICE

(71) Applicant: DMG MORI Company Limited, Nara (JP)

(72) Inventors: Ken Onoe, Isehara (JP); Akira Kimura, Isehara (JP); Ryosuke Kamiko, Isehara (JP)

(73) Assignee: DMG MORI Company Limited, Nara (JP)

(*) Notice: Subject to any disclaimer, the term of this patent is extended or adjusted under 35 U.S.C. 154(b) by 210 days.

(21) Appl. No.: 15/708,983

(22) Filed: Sep. 19, 2017

(65) Prior Publication Data
US 2018/0080767 A1 Mar. 22, 2018

(30) Foreign Application Priority Data

Sep. 20, 2016 (JP) .................... 2016-183427

(51) Int. Cl.
*G01B 7/012* (2006.01)
*G01C 9/02* (2006.01)
*G01L 1/12* (2006.01)

(52) U.S. Cl.
CPC .............. *G01C 9/02* (2013.01); *G01B 7/012* (2013.01); *G01L 1/12* (2013.01)

(58) Field of Classification Search
CPC ....... G01B 5/012; G01B 7/012; G01B 11/012
USPC .................................................. 33/556, 559
See application file for complete search history.

(56) References Cited

U.S. PATENT DOCUMENTS

| 3,660,906 A * | 5/1972 | Zimmerman | G01B 5/012 33/559 |
| 4,138,823 A * | 2/1979 | McMurtry | G01B 7/012 33/559 |
| 4,279,080 A * | 7/1981 | Nakaya | G01B 7/012 33/561 |
| 4,443,946 A * | 4/1984 | McMurtry | G01B 7/012 33/561 |
| 4,477,976 A * | 10/1984 | Suzuki | G01B 7/012 33/558 |
| 4,941,266 A * | 7/1990 | Bissegger | G01B 5/012 33/556 |
| 5,146,691 A | 9/1992 | McMurtry | |
| 5,333,388 A * | 8/1994 | Butler | G01B 5/012 33/556 |
| 5,594,995 A * | 1/1997 | Matsuhashi | G01B 5/012 33/558 |
| 5,755,038 A | 5/1998 | McMurtry | |

(Continued)

FOREIGN PATENT DOCUMENTS

JP      4339205 A    11/1992
JP      9507918 A    8/1997

*Primary Examiner* — Christopher W Fulton
(74) *Attorney, Agent, or Firm* — The Webb Law Firm

(57) ABSTRACT

There is provided a detecting device which detects a contact with an object, which includes, a fixed portion provided in the detecting device, a shaft portion, and a base portion which is connected to the shaft portion and configured to move relative to the fixed portion, a sensor which measures a displacement resulting from an inclination of the base portion relative to the fixed portion caused by a contact between an object and the shaft portion, and a control portion which determines if a contact between an object and the shaft portion occurs or not based on the measured displacement.

9 Claims, 9 Drawing Sheets

(56) References Cited

U.S. PATENT DOCUMENTS

| | | | | |
|---|---|---|---|---|
| 5,756,886 A | * | 5/1998 | Nishimura | G01B 5/016 33/558 |
| 7,228,641 B2 | * | 6/2007 | Hunter | F16C 17/08 33/556 |
| 7,594,339 B2 | * | 9/2009 | Seitz | G01B 5/012 33/503 |
| 2005/0278969 A1 | * | 12/2005 | Jordil | G01B 5/012 33/559 |
| 2013/0238272 A1 | * | 9/2013 | Chen | G01B 3/22 702/95 |

* cited by examiner

PRIOR ART

DETECTING DEVICE

CROSS-REFERENCE TO RELATED APPLICATION

This application claims priority to Japanese Patent Application No. 2016-183427 filed Sep. 20, 2016, the disclosure of which is hereby incorporated in its entirety by reference.

The present disclosure relates to a detecting device which detects contact with an object.

A detecting device which detects contact with an object is used in various technical fields, such as for measurement of dimensions in a machine tool. In such a detecting device, there is proposed a contact probe which detects contact with an object by detecting an initial distortion when a stylus with three-point suspension contacts an object, for example, in JP H09 (1997)-507918 (Herein after called "Patent document 1").

According to the contact probe described in Patent document 1, a strain gauge is attached to a member connected to the stylus, and when the stylus contacts an object, contact with the object is detected based on the initial distortion (a change of resistance value) of the strain gauge. Thus, contact with an object is detected at the moment when the stylus slightly moves by contact with an object.

In the stylus with three-point suspension described in Patent document 1, it can be said that a high repeatability is obtained when the stylus seats on the base. However, since the three-point suspension collapses at the moment when the stylus moves, thereby causing a mechanically unstable state, it is difficult to precisely detect further motion of the stylus by a pressing force of an object. Accordingly, it cannot be said that the contact probe described in Patent document 1 has good lobe characteristics, and a probe with good lobe characteristics is desired.

The present disclosure is made to address the above-mentioned problem. It is an object of the present disclosure to provide detecting device which detects a contact with an object in a repeatable fashion and achieves repeatability and precise detection of a contact with an object.

SUMMARY OF THE DISCLOSURE

In order to solve the above-mentioned problem, there is provided a detecting device according to one aspect of the present disclosure, which detects a contact with an object. The detecting device includes:

a fixed portion provided in the detecting device, a shaft portion, and a base portion which is connected to the shaft portion and configured to move relative to the fixed portion, a sensor which measures a displacement resulting from an inclination of the base portion relative to the fixed portion caused by a contact between an object and the shaft portion, and a control portion which determines if contact between an object and the shaft portion occurs or not based on the measured displacement.

DESCRIPTION OF EMBODIMENTS

A detecting device according to embodiments of the present disclosure is hereinafter described with reference to the attached drawings.

(Description of Detecting Device According to First Embodiment of Disclosure)

Figure 1:
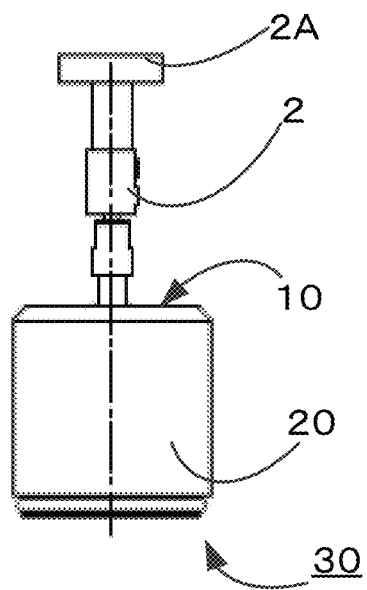
FIG. 1 is a side view for schematically illustrating a probe of a detecting device according to a first embodiment of the present disclosure.
Figure 2:
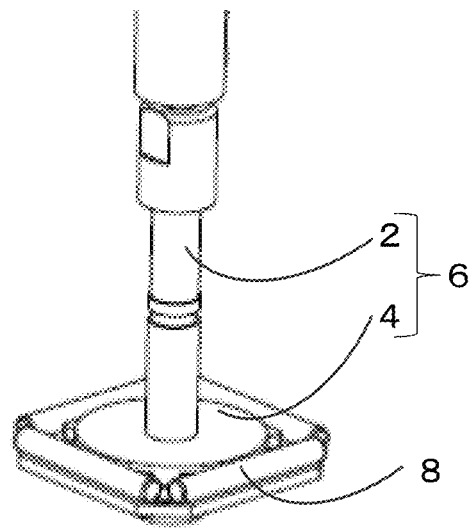
FIG. 2 is a perspective view for schematically illustrating a stylus of the probe illustrated in FIG. 1.
Figure 3:
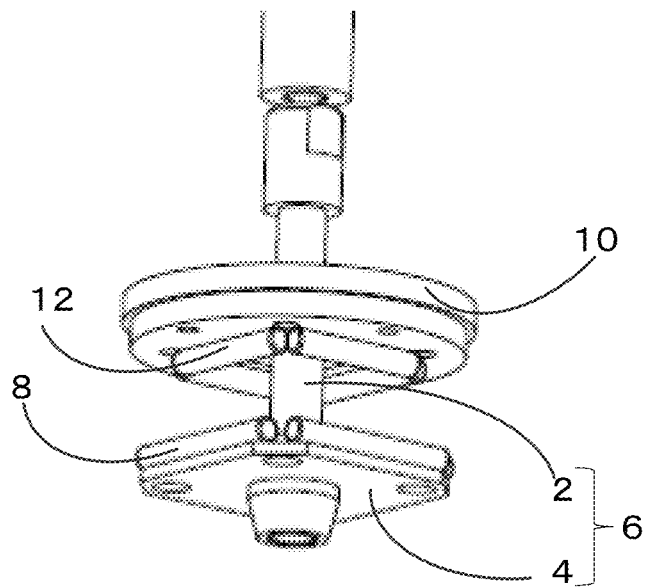
FIG. 3 is a perspective view for schematically illustrating the stylus and a fixed portion of the probe illustrated in FIG. 1.

Firstly, a probe of a detecting device according to a first embodiment of the present disclosure is described with reference to FIGS. 1 to 4. FIG. 1 is a side view for schematically illustrating a probe 30 of the detecting device according to the first embodiment of the present disclosure. FIG. 2 is a perspective view for schematically illustrating a stylus 6 of the probe 30 illustrated in FIG. 1. FIG. 3 is a perspective view for schematically illustrating the stylus 6 and a fixed portion 10 of the probe 30 illustrated in FIG. 1.

Figure 4:
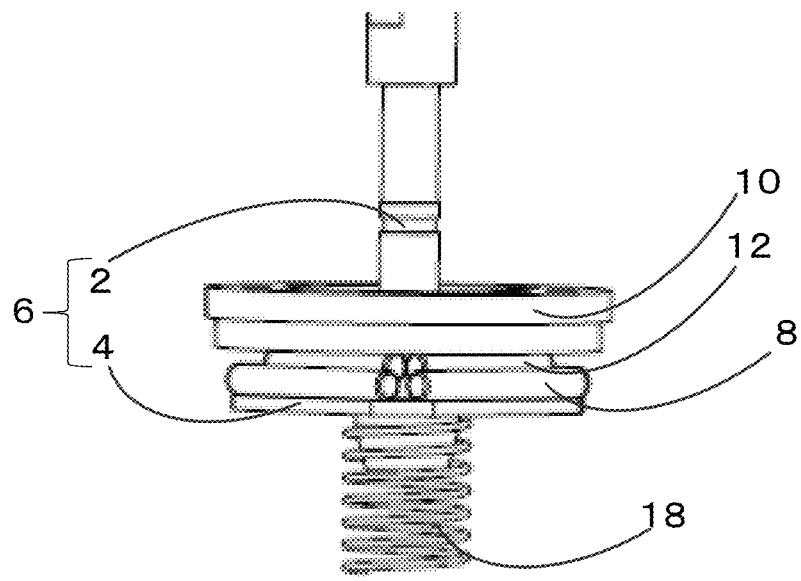
FIG. 4 is a side view for schematically illustrating a state that the stylus is pressed to the fixed portion by a compression spring in the probe illustrated in FIG. 1.

FIG. 4 is a side view for schematically illustrating a state wherein the stylus 6 is pressed to the fixed portion 10 by a compression spring 18 in the probe 30 illustrated in FIG. 1. In the following description, "up and down" and "left and right" will be specified as applicable to each of the drawings.

The probe 30 according to this embodiment includes the stylus 6 which is configured with a shaft portion 2 and a base portion 4 connected to the shaft portion 2. The shaft portion 2 extends perpendicular to the base portion from a center part of the base portion 4, and has a contact portion 2A with an object at a tip of the shaft portion 2. In the base portion 4, four supporting bars 8 are placed such that four sides of a quadrangle are formed, as surrounding the shaft portion 2.

Further, a body 20 having the fixed portion 10 is provided in the probe 30. The base portion 4 of the stylus 6 is placed within the body 20. The shaft portion 2 of the stylus 6 extends outwards from the body 20 through an opening provided at a center part of the fixed portion 10. There is a clearance between the shaft portion 2 and the opening, thereby achieving a state that the base portion 4 of the stylus 6 can move relative to the fixed portion 10.

In any drawing, the contact portion 2A which contacts an object is placed at the upper side of the probe in the detecting device according to embodiments of the present disclosure.

In the fixed portion 10, four fixed portion side supporting bars 12 are provided such that four sides of a quadrangle are formed. The four fixed portion side supporting bars 12 are placed approximately in parallel with the four supporting bars 8 provided in the base portion 4 of the stylus 6 respectively. The base portion 4 of the stylus 6 is placed lower than the fixed portion 10 (a side located farther away from the contact portion 2A). In this embodiment, the four fixed portion side supporting bars 12 are placed at the inner side (a center side of the shaft portion 2) than the four supporting bars 8. Thus, at each side of the quadrangle, the four fixed portion side supporting bars 12 are placed diagonally at inner and upper position than the supporting bars 8. An advantage obtained by this arrangement is described later with reference to FIG. 10A and FIG. 10B.

As illustrated in FIG. 4, one end of a compression spring 18 contacts a lower surface of the base portion 4 of the stylus 6, and the other end of the compression spring 18 contacts a bottom surface of the body 20. The compression spring 18 is installed under the pre-compressed condition, and therefore the base portion 4 of the stylus 6 is pressed towards the fixed portion 10 side by the compression spring 18. Accordingly, in an initial state that the shaft portion 2 of the stylus 6 does not contact an object, the four supporting bars 8 provided in the base portion 4 of the stylus 6 come into line contact with the four fixed portion side supporting bars 12 provided in the fixed portion 10 respectively. Strictly speaking, since surfaces of both the supporting bars 8 and the fixed portion side supporting bars 12 have micro irregularity, it can be said that the above-mentioned "line contact" means the "point contact in a plurality of points."

In an initial state that the shaft portion 2 of the stylus 6 does not contact an object, a surface of the base portion 4 and a surface of the fixed portion 10 are placed in parallel. Since the shaft portion 2 extends in perpendicular to the base portion 4, it can also be said that the shaft portion 2 extends in a direction perpendicular to the fixed portion 10.

Figure 5:
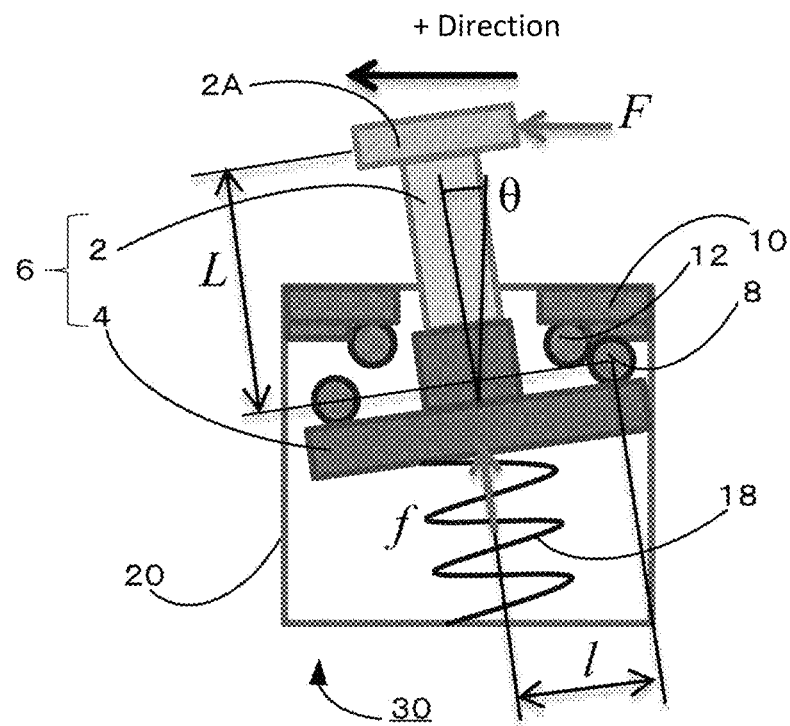
FIG. 5 is a schematic drawing for describing a balance of rotational moment of the stylus which inclines due to contact with an object.

Next, with reference to FIG. 5, there is described a state that the base portion 4 of the stylus 6 inclines relative to the fixed portion 10 when the shaft portion 2 of the stylus 6 contacts an object. FIG. 5 is a schematic drawing for describing a balance of rotational moment of the stylus 6 which inclines due to contact with an object.

FIG. 5 illustrates a state that the shaft portion 2 of the stylus 6 inclines relative to the fixed portion 10 by degree $\Theta$ from an initial state in which the shaft portion 2 is positioned approximately perpendicular to the fixed portion 10. Since the shaft portion 2 and the base portion 4 cross approximately at right angles, it can be said that the base portion inclines by inclination angle $\Theta$ from an initial state. The angle $\Theta$ is also shown in other drawings.

As illustrated in FIG. 5, the base portion 4 of the stylus 6 inclines relative to the fixed portion 10 by a pressing force F from an object caused by contact between the shaft portion 2 of the stylus 6 and the object. Accordingly, in the four supporting bars 8 provided in the base portion 4, three supporting bars 8 out of four move away from the fixed portion side supporting bars 12, and the remaining one supporting bar 8 out of four placed in an abutting portion comes into line contact with one fixed portion side supporting bar 12 out of four placed in the fixed portion 10. This abutting portion becomes a rotation center for inclination of the base portion 4 of the stylus 6. Contact with an object can be detected based on a displacement resulting from the inclination of the base portion 4.

With respect to the contact portion 2A located at the tip of the shaft portion 2 which contacts an object, it is preferable to form the contact portion 2A using a super hard material such as tungsten carbide or ceramic, which is not damaged nor scraped even if hit by a cutting tool, considering the case that an object is a cutting tool of a machine tool or the like. It is preferable that the contact portion 2A of the shaft portion 2 has a movable configuration which achieves a vertical adjustment, horizontal adjustment or the like to the fixed portion 10.

The shaft portion 2 of the stylus 6 is placed between an abutting part of the fixed portion 10 with the base portion 4 (specifically, a line contact part between the supporting bar 8 and the fixed portion side supporting bars 12) and an object. The direction that an object contacts the shaft portion 2 (a direction of the pressing force F of FIG. 5) is a direction approximately perpendicular to the four sides of a quadrangle formed by the supporting bars 8 or the fixed portion side supporting bars 12.

The direction that an object contacts the shaft portion 2 does not have to be strictly perpendicular to the four sides of a quadrangle. Even in the case that an object contacts the shaft portion 2 in a direction having a certain angle α from the perpendicular direction to the four sides, if the following formula is satisfied, the supporting bars 8 and the fixed portion side supporting bars 12 do not shift from each other and precise detection can be achieved:

$$\text{Tan } \alpha < u$$

u: a coefficient of friction between the supporting bar 8 and the fixed portion side supporting bar 12.

<Description of Inclination of Stylus with Three-Point Suspension>

Figure 14:
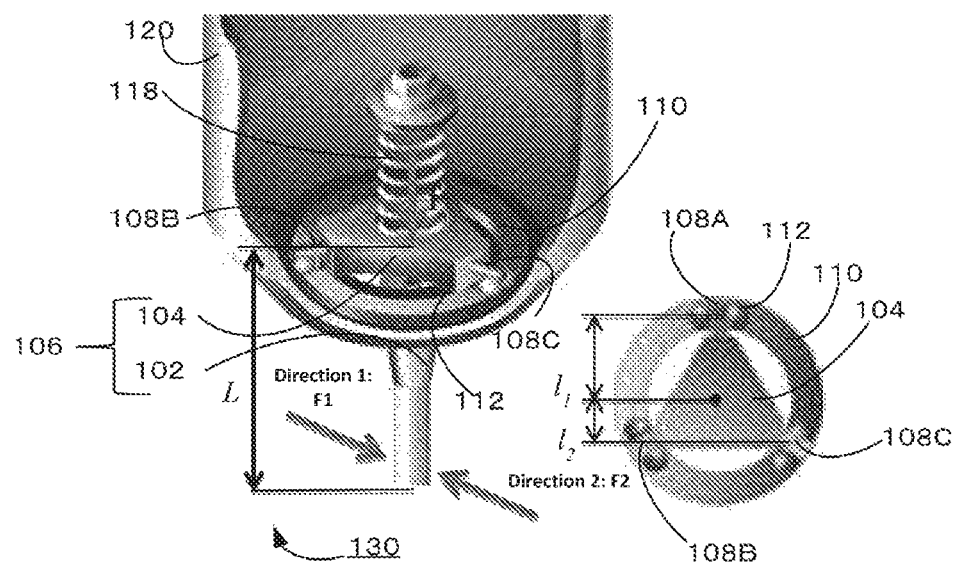
FIG. 14 is an exploded perspective and plain view for schematically illustrating a probe with three-point suspension.

With reference to FIG. 14, it is described that an ordinary stylus with three-point suspension inclines when it contacts an object. FIG. 14 is an exploded perspective and plain view for schematically illustrating a probe 130 with three-point suspension. The exploded perspective view of the probe 130 is shown in the left side and the plan view of a base portion 104 and a fixed portion 110 seen from the above is shown in the right side. In FIG. 14, a contact portion with an object is placed below the probe.

As illustrated in FIG. 14, the probe 130 has a construction such that each of bars 108A, 108B and 108C of the three-point suspension connected to the base portion 104 of the stylus 106 is supported by two spherical bodies 112 respectively. At a moment that the shaft portion 102 of the stylus 106 contacts an object and at least one point of the three point suspension loses contact with the spherical bodies 112, a stable construction collapses and an unstable state occurs. Even if only one point out of three floats in the air, repeatability of start-up of movement is lost after such action.

Accordingly, even if the stylus 106 moves slightly, contact with an object is detected. Therefore, if there is vibration or the like, it will cause a malfunction. In order to prevent the stylus 106 from moving by vibration or the like, it is considered to strengthen a compression spring 118 which presses the base portion 104 to the fixed portion 110.

However, in this case, there is a possibility that a movement of the stylus 106 will become slow, a measured item will be broken if it has a small diameter, or a measured item will be damaged. The lobe characteristics also become worse due to the larger spring force loaded to the three-point suspension.

Further, a problem occurs because a force applied from the opposite direction is not uniform.

As illustrated in FIG. 14, a balance between a rotational moment by a pressing force F1 from an object in direction 1 and a rotational moment by a spring force f of the compression spring 118 is described in the following formula:

$$F1 = f^* l_1 / L.$$

A balance between a rotational moment by the pressing force F2 from an object in direction 2 and a rotational moment by a spring force f of the compression spring 118 is described in the following formula:

$$F2 = f^* l_2 / L.$$

Accordingly, the moment in direction 1 and the moment in direction 2 are not identical.

<Description of Inclination of Stylus According to Embodiment>

On the contrary, in the embodiment of the present disclosure, as illustrated in FIG. 5, when the base portion 4 of the stylus 6 inclines due to a rotational moment by the pressing force F from an object, the compression spring 18 is compressed more than an initial state, thereby generating the spring force f. Then, when the base portion 4 inclines by an angle $\ominus$, a rotational moment (F×L×cos $\ominus$) by a pressing force F and a rotational moment (f×l) by the spring force f are balanced. Thus, the following formula is obtained:

$$F \times L \times \cos \ominus = f \times l (F = f^* l / L \cos \ominus).$$

In this case, even in the case that a pressing force F is added by an object from a side opposite to the case illustrated in FIG. 5 (from left to right in the drawing), or even in the case that a pressing force F is added by an object in a direction perpendicular to the sheet, a balance of the rotational moment that is similar to the above can be obtained. Therefore, a reproducible and stable condition can always be formed. Therefore, the base portion 4 inclines corresponding to pressing forces from four directions in a reproducible condition, and contact with an object can precisely be detected based on a displacement resulting from the inclination of the base portion 4. In this embodiment, since contact with an object from four directions can be detected, for example, in the case that this detecting device is applied to a machine tool, it can improve measuring efficiency.

As described later, in this embodiment, since contact with an object is not judged based on a start point of an inclination of the base portion 4 resulting from a contact with an object, but judged based on a measured displacement resulting from an inclination of the base portion 4 after the start point, which has reproducibility, it is not necessary to increase a spring force of the compress spring 18 in order to prevent a malfunction due to a vibration. Therefore, the above-mentioned problem relating to the stylus with three-point suspension does not occur.

<Description of Control Device and Control Process of Detecting Device According to First Embodiment of Disclosure>

Figure 6:
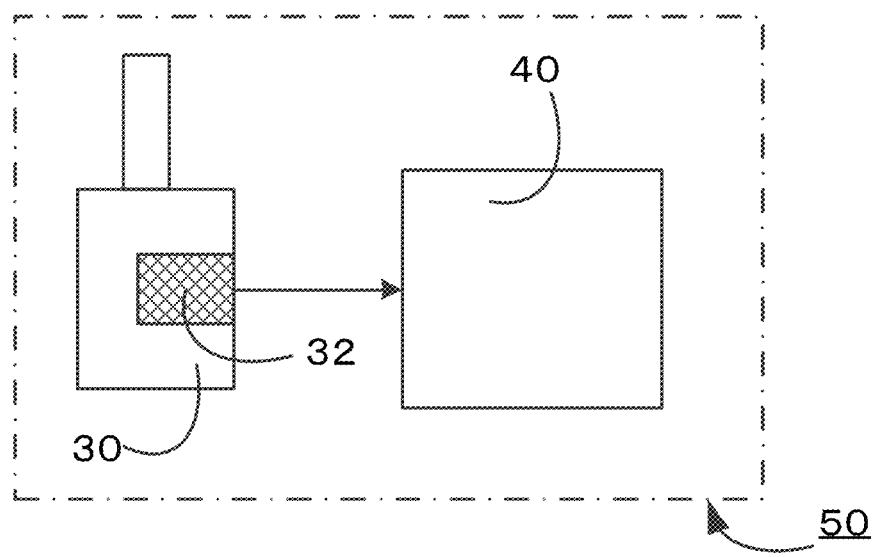
FIG. 6 is a block diagram for illustrating a configuration of a control device of the detecting device according to the first embodiment of the present disclosure.
Figure 7:
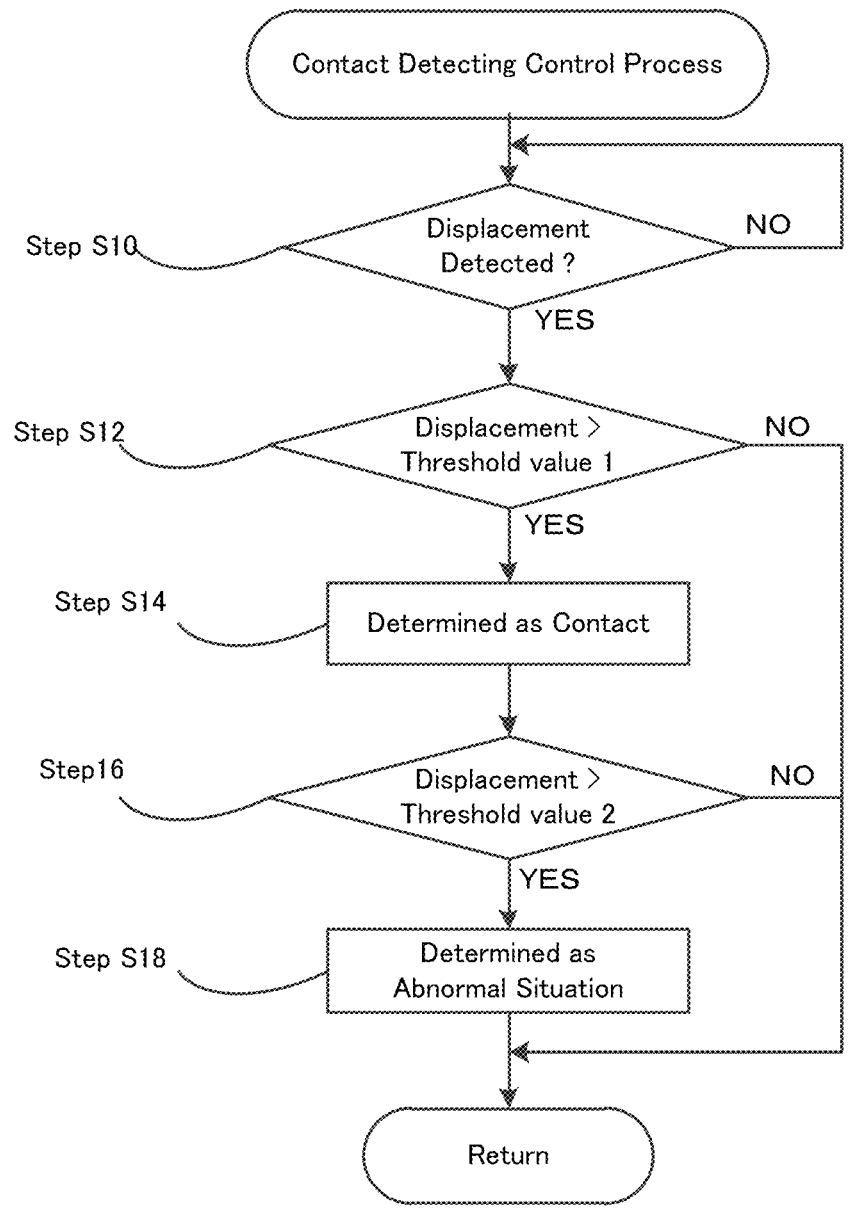
FIG. 7 is a flow chart for illustrating a control process performed by a control portion of the detecting device according to the first embodiment of the present disclosure.

Next, with reference to FIG. 6 and FIG. 7, a control device and a control process of the detecting device according to the first embodiment of the present disclosure are described. FIG. 6 is a block diagram for illustrating a configuration of a control device of the detecting device 50 according to the first embodiment of the present disclosure. FIG. 7 is a flow chart for illustrating a control process performed by a control portion 40 of the detecting device 50 according to the first embodiment of the present disclosure.

As illustrated in FIG. 6, the detecting device 50 according to the first embodiment of the present disclosure includes a sensor 32 which measures a displacement resulting from an inclination of the base portion 4 caused by contact between an object and the shaft portion 2, and a control portion 40 which receive a signal from the sensor 32. The control portion 40 can determine if contact between an object and the shaft portion 2 occurs or not based on the displacement measured by the sensor 32.

As the sensor 32, any device which detects a displacement resulting from an inclination of the base portion 4 can be used. The measured displacement can be an inclination angle of the base portion 4, a translational movement corresponding to the inclination angle or a deformation corresponding to the inclination angle. The sensor 32 can be placed not only inside the probe 30 as illustrated in FIG. 6, but also outside the probe 30. The control portion 40 includes a computing portion and a memory portion. The control portion 40 can be provided exclusively for the detecting device 50. In this case, the control portion 40 can be incorporated into the probe 30. On the contrary, the control portion 40 can be configured as a part of a control device of an equipment (for example, a machine tool) in which the probe 30 is installed.

Next, with referring to the flowchart of FIG. 7, a control process performed by the control device 40 is described. In FIG. 7, firstly it is judged if the sensor 32 detects a displacement resulting from an inclination of the base portion 4 or not (Step 10). In this judgment step, if it is determined that the sensor 32 does not detect a displacement (NO), this judgment step is repeated. Thus, a waiting status continues until a displacement is detected.

In the judgment of Step 10, if it is determined that the sensor 32 detects a displacement resulting from an inclination of the base portion 4 (YES), in the next step, it is judged if the measured value of the displacement exceeds a threshold value 1 or not (Step S12). In this judgment, if it is determined that the measured value does not exceed the threshold value 1 (NO), this control process is completed. In the judgment of Step 12, if it is determined that the measured value exceeds the threshold value 1 (YES), accordingly it is determined that a contact with an object occurs (Step S14).

Next, it is judged if the measured value of the displacement exceeds a threshold value 2 that is larger than the threshold value 1, or not (Step S16). In this judgment, if it is determined that the measured value does not exceed the threshold value 2 (NO), this control process is completed. In the judgment of Step 16, if it is determined that the measured value exceeds the threshold value 2 (YES), it is determined that an abnormal situation occurs (Step 18), and then the successive control process is completed.

The case that the measured value exceeds the threshold value 2 means that the shaft portion 2 of the stylus 6 is excessively pressed by an object to the left side in FIG. 5. Accordingly, there is provided a signal for quickly stopping pressing action to the shaft portion 2, and retracting an object to the right side in FIG. 5.

In this embodiment, since the control portion 40 determines that contact with an object occurs when the measured displacement exceeds the threshold value 1, a precise detection of contact with an object in a reproducible condition can be obtained by applying an appropriate value for the threshold value 1. Further, since the control portion 40 determines that an abnormal situation occurs when the measured value of the displacement exceeds the threshold value 2 that is larger than the threshold value 1, it can precisely detect the abnormal situation such that an object is excessively presses the shaft portion 2, and prevent in advance a significant problem from occurring, by applying an appropriate value for the threshold value 2.

Relating to the reproducible detection of contact, the similar function can be obtained not only by the above-mentioned control process of the control portion 40, but also, for example, by a method such that an eddy current sensor is used for the sensor, and a threshold value is provided in an electrical circuit based on a change of inductance resulting from an inclination of the base portion 4.

As mentioned above, the detecting device 50 according to this embodiment detects contact with an object. The detecting device 50 includes the fixed portion 10 provided in the detecting device 50, the stylus 6 having the shaft portion 2 and the base portion 4 which is connected to the shaft portion 2 and configured to move relative to the fixed portion 10, the sensor 32 which measures a displacement resulting from an inclination of the base portion 4 relative to the fixed portion 10 caused by contact between an object and the shaft portion 2, and the control portion 40 which determines if contact between an object and the shaft portion 2 occurs or not based on the measured displacement.

Since the control portion 40 judges if contact with an object occurs or not, it can detect contact with an object in a reproducible condition, thereby achieving a reproducible and precise detection of the contact.

Further, in the state that the shaft portion 2 contacts an object, the fixed member (the fixed portion side supporting bar 12 in this embodiment) is provided in the fixed portion 10, the shaft portion 2 is placed between the abutting part of the fixed member with the base portion 4 (the line contact part between the supporting bar 8 and the fixed portion side supporting bars 12 in this embodiment) and an object, and the base portion 4 inclines relative to the fixed portion 10 around the abutting portion of the base portion 4 as a rotation center.

As mentioned above, since the fixed portion 10 has the fixed member which contacts the base portion 4, the base portion 4 can incline relative to the fixed portion 10 stably in a reproducible fashion.

In this embodiment, specifically, the four supporting bars 8 are placed at the abutting portion of the base portion 4 such that four sides of a quadrangle are formed. Further, the fixed member of the fixed portion 10 is configured with the four fixed portion side supporting bars 12 which are placed corresponding to the four supporting bars 8 placed on the abutting portion of the base portion 4 such that four sides of a quadrangle are formed. Then, the base portion 4 inclines relative to the fixed portion 10 by the pressing force F from an object due to contact between the shaft portion 2 and the object, thereby making one of the four supporting bars 8 placed at the abutting portion come into line contact with one of the four fixed portion side supporting bars 12 which configures the fixed member. Accordingly, contact with an object from four directions can be detected in a reproducible condition.

Figure 12:
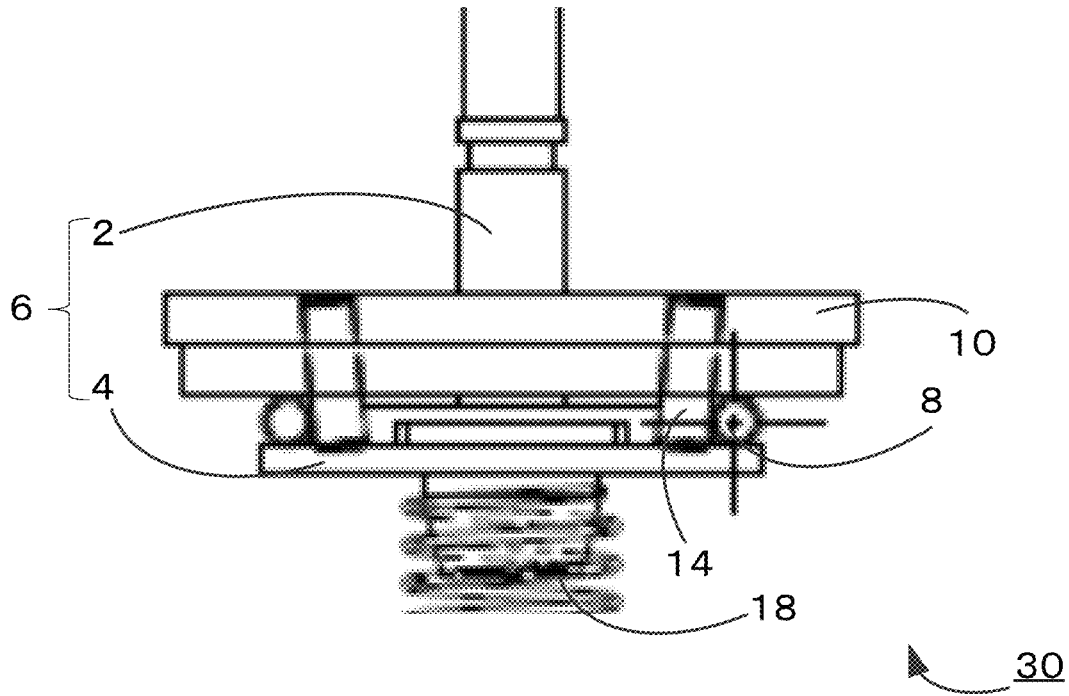
FIG. 12 is a side view for schematically illustrating a probe of a detecting device according to a second embodiment of the present disclosure.
Figure 13:
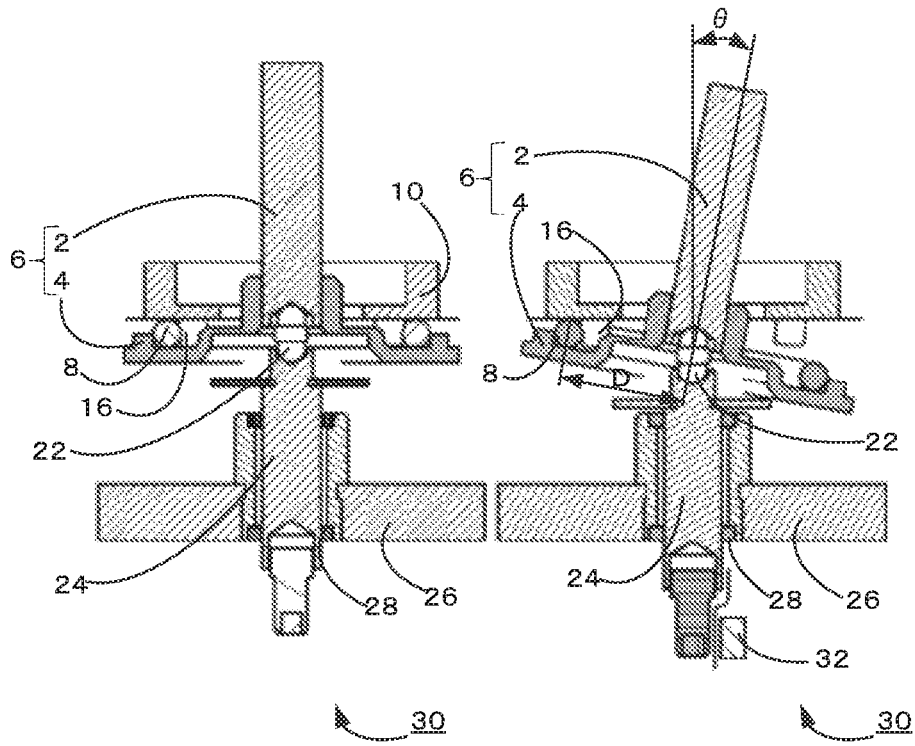
FIG. 13 is a side view for schematically illustrating a probe of a detecting device according to a third embodiment of the present disclosure.

As the fixed member provided in the fixed portion 10, it can use not only a shape such as the four fixed portion side supporting bars 12 according to this embodiment, but also any other shape including a pin as illustrated in FIG. 12, and an abutting member having a curved concave as illustrated in FIG. 13.

As mentioned above, any shape can be applied on the combination of the base portion 4 and the fixed portion 10, as long as it can form an abutting portion which can be a rotational center for an inclination with reproducibility. The abutting portion which becomes a rotational center of an inclination is not limited to that of line contact. If at least two contact points are obtained, it can form a rotational center for an inclination with stability and reproducibility.

Further, in this embodiment, the contact from four directions is detected. However, it is not limited thereto, and it is acceptable if the contact at least from one direction is detected. In this case, it can form an abutting portion between the base portion 4 and the fixed portion 10 such that a rotational center for an inclination is formed at least from one direction.

(Description of Alternative Example of Probe of Detecting Device According to First Embodiment of Disclosure)

Figure 8A:
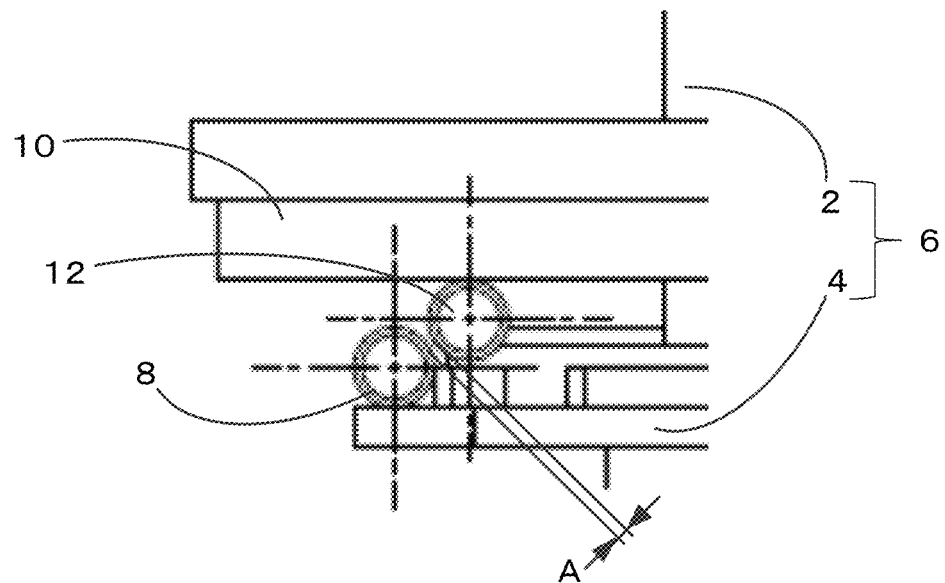
FIG. 8A is a side view for schematically illustrating an alternative example of the probe according to the first embodiment of the present disclosure, specifically for illustrating a state that a shaft portion of the stylus does not contact an object.
Figure 8B:
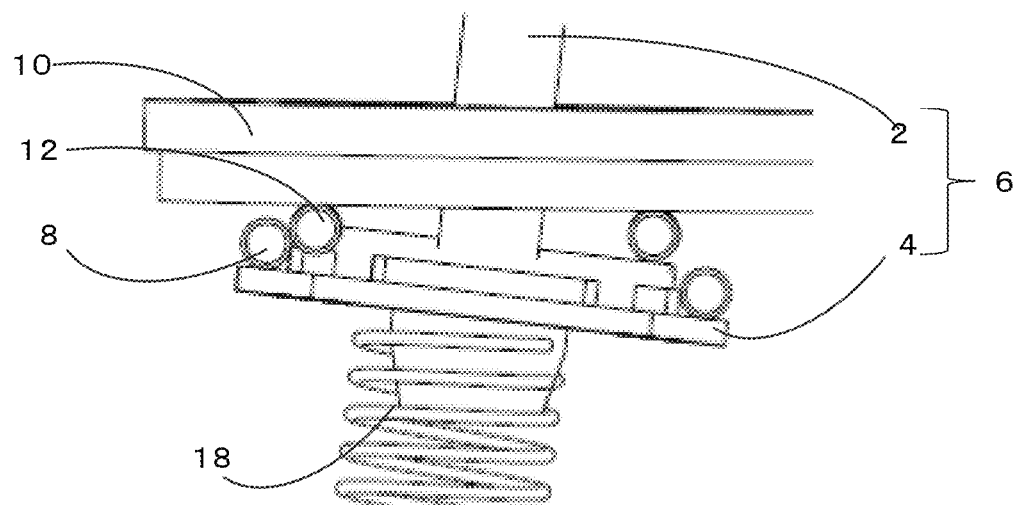
FIG. 8B is a side view for schematically illustrating an alternative example of the probe according to the first embodiment of the present disclosure, specifically for illustrating a state that the shaft portion of the stylus contacts an object.

Next, with reference to FIG. 8A and FIG. 8B, an alternative example of the probe of the detecting device according to the first embodiment of the present disclosure is described. FIG. 8A is a side view for schematically illustrating an alternative example of the probe according to the first embodiment of the present disclosure, specifically for illustrating a state that a shaft portion 2 of a stylus 6 does not contact an object. FIG. 8B is a side view for schematically illustrating an alternative example of the probe according to the first embodiment of the present disclosure, specifically for illustrating a state that a shaft portion 2 of the stylus 6 contacts an object.

In the above-mentioned embodiment, the base portion 4 (in detail, the supporting bar 8) contacts the fixed member of the fixed portion 10 (in detail, fixed portion side supporting bar 12) in the state that the shaft portion 2 of the stylus 6 does not contact an object. However this alternative example is different from the above-mentioned embodiment in the following point: there is a distance A between a base portion 4 (a supporting bar 8) and a fixed member of a fixed portion 10 (a fixed portion side supporting bar 12) in an initial state in which a shaft portion 2 of a stylus 6 does not contact an object. Then, when the shaft portion 2 contacts an object, the base portion 4 moves to the left side in FIG. 8A, and then abuts the fixed member (fixed portion side supporting bar 12) as illustrated in FIG. 8B. After that, the base portion 4 inclines relative to the fixed portion 10 around this abutting portion as a rotational center.

As mentioned above, since the control portion 40 determines if a contact with an object occurs or not based on the measured displacement, it can detect a contact with an object in a reproducible fashion. However, even by the mechanical means which has a clearance in the initial stage as shown in this alternative example, the base portion 4 can always incline in a reproducible fashion through obtaining an appropriate pre-stroke by setting an appropriate value for the distance A.

Specifically, at the initial stage of contact with an object which will be changed from the static friction to the dynamic friction, an unstable condition with a low reproducibility is likely to occur. However, it can prevent the base portion 4 from starting an inclination in an unstable condition by the pre-stroke with the appropriate value according to the clearance distance A.

(Description of Stylus's Coming Out of Fixed Portion)

Next, with reference to FIGS. 9A to 11, there is described a construction with a possibility that the stylus comes out of the fixed portion, and a construction without a possibility that the stylus comes out of the fixed portion.

Figure 9A:
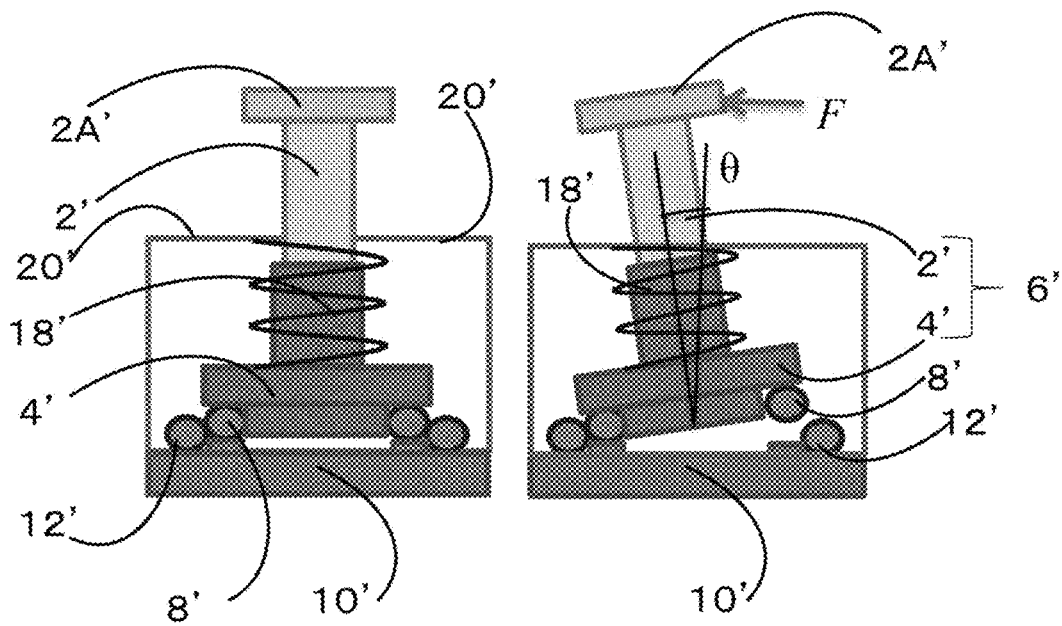
FIG. 9A is a drawing for schematically illustrating a construction with a possibility that the stylus comes out of the fixed portion.
Figure 9B:
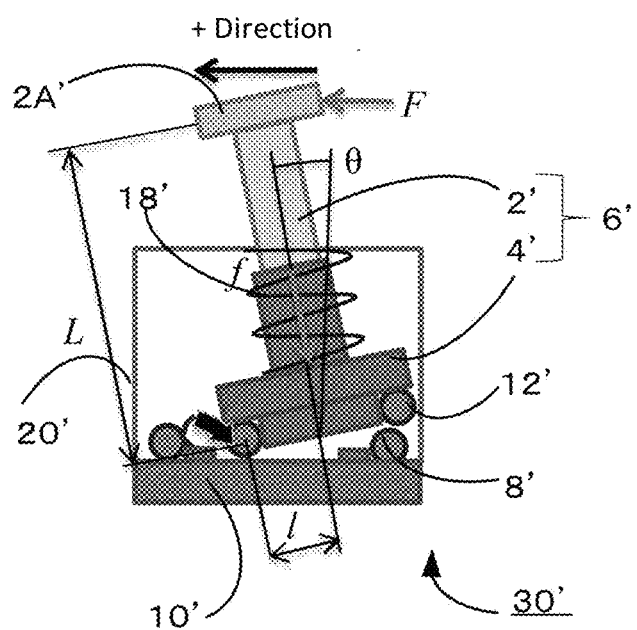
FIG. 9B is a drawing for schematically illustrating an arrangement of the rotational moment with a possibility that the stylus comes out of the fixed portion.

Firstly, with reference to FIG. 9A and FIG. 9B, a construction with a possibility that the stylus comes out of the fixed portion is described. FIG. 9A is a drawing for schematically illustrating a construction having a possibility that the stylus comes out of the fixed portion. FIG. 9B is a drawing for schematically illustrating a status of the rotational moment in the case that the stylus comes out of the fixed portion.

A state without contacting an object is illustrated in the left side of FIG. 9A, and a state that the base portion 4 inclines caused by contacting an object is illustrated in the right side of FIG. 9A. The construction illustrated in FIG. 9A is different from the above-mentioned embodiment in the following point: a base portion 4' is placed at the upper side of a fixed portion 10' (a closer side to a contact portion 2A'). Therefore, the base portion 4' (in detail, the supporting bar 8') is pressed to the fixed portion 10' (in detail, the fixed portion side supporting bars 12') due to a force by a compress spring 18' added in the direction from the upper side to the lower side.

The following symbol is applied:
$\Theta$: an inclination angle of the base portion 4'(Drawing shows as an inclination angle of the shaft portion 2')
F: a pressing force added to the contact portion 2A' by an object
f: a spring force of the compress spring 18'
L: a distance between the rotational center for inclination and the contact portion 2A': L=50 mm
l: a distance between the rotational center for inclination and a center of the compress spring 18': l=6 mm
u: a coefficient of friction between the supporting bars 8' and the fixed portion side supporting bars 12': u=0.05

A balance of the rotational moment around the rotational center for inclination is described as follows:

$$F \times L \times \cos \Theta = f \times l (F = f*l/L \cos \Theta).$$

Further, according to a balance of the force, a condition that the supporting bars 8', 12' do not shift from each other is described as follows:

$$u \times f \cos \Theta > f \sin \Theta - F.$$

Therefore, the condition that the supporting bars 8', 12' do not shift from each other is $$\Theta < 9 \text{ degrees}$$

as a calculation result thereof.

As mentioned above, in the construction illustrated in FIG. 9A and FIG. 9B, since the base portion 4' is placed at the upper side of a fixed portion 10', stylus 6' (the base portion 4') comes out of the fixed portion 10' if the base portion 4' inclines by 9 degrees or more.

Figure 10A:
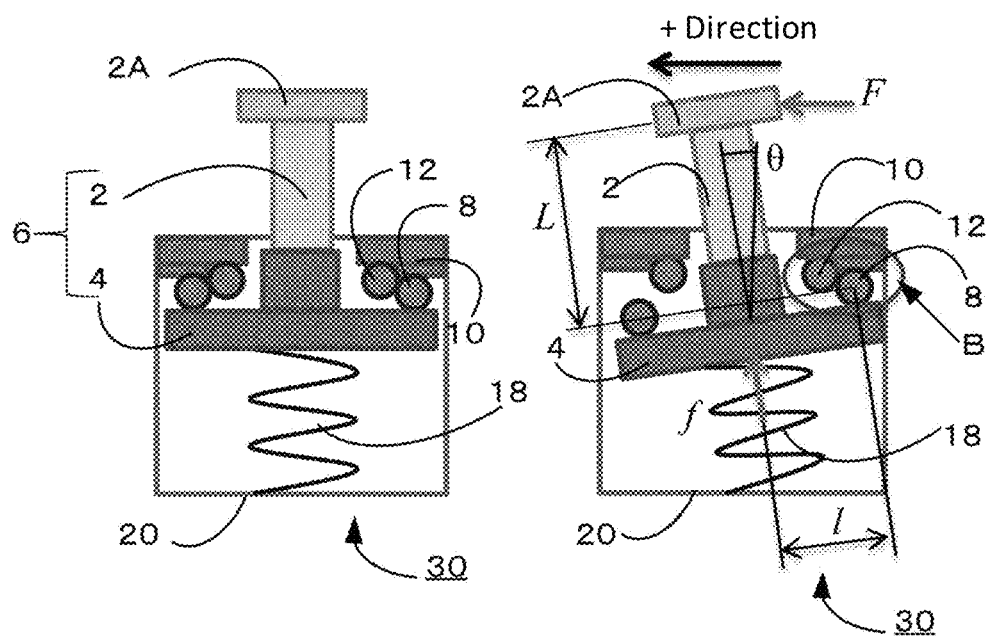
FIG. 10A is a drawing for schematically illustrating a construction without a possibility that the stylus comes out of the fixed portion, and a balance of the rotational moment thereof.
Figure 10B:
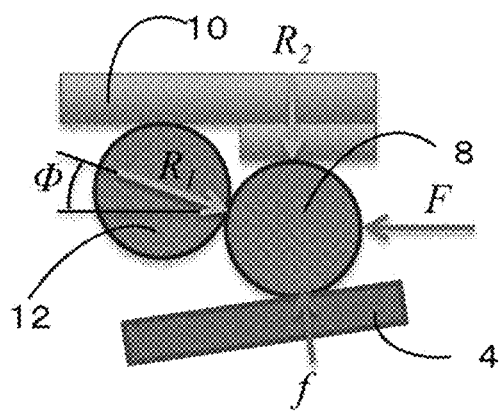
FIG. 10B is an enlarged view of a portion as indicated by an arrow B of FIG. 10A, specifically for schematically illustrating a reaction force at the fixed portion.
Figure 11:
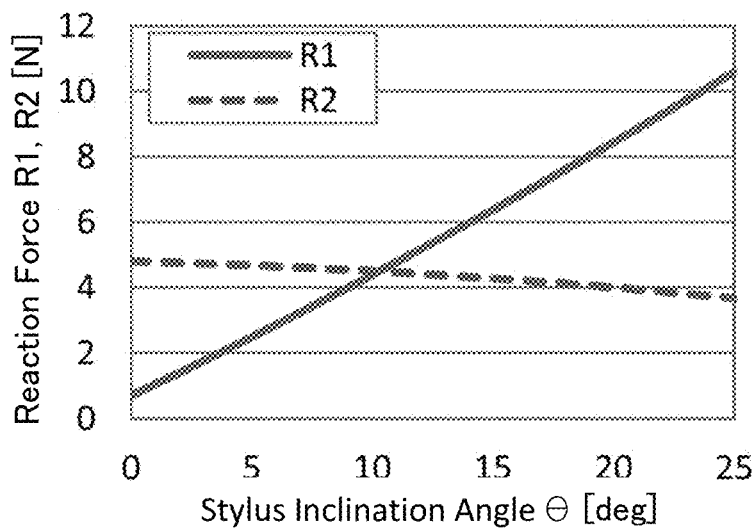
FIG. 11 is a graph for showing the relationship between a reaction force at the fixed portion and an inclination of the stylus.

Next with reference to FIG. 10A, FIG. 10B and FIG. 11, there is described a construction without a possibility that the stylus comes out of the fixed portion. FIG. 10A is a drawing for schematically illustrating a construction without a possibility that the stylus comes out of the fixed portion, and a balance of the rotational moment thereof. FIG. 10B is an enlarged view of a portion as indicated by an arrow B of FIG. 10A, specifically for schematically illustrating a reaction force at the fixed portion. FIG. 11 is a graph for showing the relationship between a reaction force at the fixed portion and an inclination of the stylus.

The construction as illustrated in FIG. 10A is the same as that of the detecting device according to the first embodiment of the present disclosure as described above. Thus, the base portion 4 is placed at the lower side of a fixed portion 10 (farther away from the contact portion 2A). Therefore, the base portion 4 (in detail, the supporting bar 8) is pressed to the fixed portion 10 (in detail, the fixed portion side supporting bars 12) due to a force by the compress spring 18 added in the direction from the lower side to the upper side.

The following symbol is applied:
$\Theta$: an inclination angle of the base portion 4 (Drawing shows as an inclination angle of the shaft portion 2)
F: a pressing force added to the contact portion 2A by an object
f: a spring force of the compress spring 18
L: a distance between the rotational center for inclination and the contact portion 2A: L=50 mm
l: a distance between the rotational center for inclination and a center of the compress spring 18: l=6 mm
u: a coefficient of friction between the supporting bars 8 and the fixed portion side supporting bars 12: u=0.05
R1: a reaction force of the fixed portion side supporting bars 12 at the abutting portion
R2: a reaction force of the fixed portion 10 against the spring force
$\phi$: an angle of the reaction force R1 relative to the horizontal direction A balance of a rotational moment around the rotational center for inclination is described as follows:

$$F \times L \times \cos \Theta = f \times l (F = f*l/L \cos \Theta).$$

According to a balance of the forces in left and right directions, a condition to keep a contact at the abutting portion (the rotational center for inclination) is described as follows:

$$F + f \sin \Theta = R1 \cos \Theta > 0.$$

Accordingly, this formula to keep a contact at the abutting portion is always satisfied.

Further, according to a balance of the forces in up and down directions, a condition to keep a contact at the abutting portion (the rotational center for inclination) is described as follows:

$$R2 = f \cos \Theta - R1 \sin \phi = f \cos \Theta - (F + f \sin \phi)*\tan \phi > 0$$

Accordingly, this formula to keep a contact at the abutting portion is always satisfied.

A relationship between reaction forces R1, R2 at the abutting portion and an inclination angle $\Theta$ of the stylus based on the above-mentioned formula is shown in a graph of FIG. 11.

As mentioned above, in the construction illustrated in FIG. 10A and FIG. 10B, the base portion 4 is placed at the lower side of the fixed portion 10 (farther away from the contact portion 2A). Thus, since the fixed portion 10 is located between the contact portion 2A which contacts an object and the base portion 4, the base portion 4 (the supporting bar 8) abuts the fixed portion 10 (the fixed portion side supporting bars 12) with a certain surface pressure, and the rotational center for inclination is formed, a stable construction that the stylus 6 (the base portion 4) does not come out of the fixed portion 10 can be obtained.

(Description of Probe of Detecting Device According to Second Embodiment of Disclosure)

Next, with reference to FIG. 12, a probe of a detecting device according to a second embodiment of the present disclosure is described. FIG. 12 is a side view for schematically illustrating a probe 30 of a detecting device according to a second embodiment of the present disclosure. It is noted that in second and third embodiments, the same reference number as that in the first embodiment is used for an element having similar function to the first embodiment.

In the probe 30 according to this embodiment, relating to a stylus 6 which includes a base portion 4 in which four supporting bars 8 are placed at an abutting portion of the base portion 4 such that four sides of a quadrangle are formed, and a shaft portion which extends from a center part of the base portion 4, it is almost the same as the first embodiment.

However, a fixed portion 10 side is different from the first embodiment in the following point. Instead of the fixed portion side supporting bars 12, four pins 14 for determining the position of the base portion 4 which does not incline relative to the fixed portion 10 is provided on a surface of the fixed portion 10 such that the pins 14 correspond to corners of the quadrangle formed by the four supporting bars 8 placed at the abutting portion.

The pins 14 are placed at inner side (a center axis side of the shaft portion 2) than the four supporting bars 8, and incline to the shaft portion side relative to a center axis of shaft portion 2.

When the base portion 4 inclines, two pins 14 come into the point contact with one supporting bar 8, and form a rotational center for inclination. Therefore, a position of the base portion 4 can be determined easily.

Further, since the pin 14 placed at inner side is set as inclining to the shaft portion 2 side, it can determine the position of the base portion 4 stably in the state that the base portion 4 does not incline, as well as the pin 14 does not interfere with the edge of the base portion 4 in the state that the base portion 4 inclines.

It is also possible that the pin 14 is placed outside the supporting bar 8 of the base portion 4. In this case, by setting the pin 14 as inclining to the outside relative to the shaft portion 2, it can determine the position of the base portion 4 stably in the state that the base portion 4 does not incline, as well as the pin 14 does not interfere with the edge of the base portion 4 in the state that the base portion 4 inclines.

In the second embodiment with the pins 14, to be similar to the above-mentioned alternative example, it is possible to have a clearance between the supporting bar 8 and the pin 14 in the initial state that the shaft portion 2 does not contact an object. Even in the case of having a clearance, a function that the pin 14 determines a position of the base portion 4 can be achieved when the supporting bar 8 abuts the pin 14.

Further, it is also possible to form a rotational center for inclination by the point contact at two points by providing the pin in the base portion 4 side and the supporting bar in the fixed portion 10 side.

(Description of Probe of Detecting Device According to Third Embodiment of Disclosure)

Next, with reference to FIG. 13, the probe of the detecting the device according to the third embodiment of the present disclosure is described. FIG. 13 is a side view for schematically illustrating a probe of a detecting device according to a third embodiment of the present disclosure.

In a probe 30 according to this embodiment, relating to a stylus 6 which includes a base portion 4 in which four supporting bars 8 are placed at an abutting portion of the base portion 4 such that four sides of a quadrangle are formed, and a shaft portion which extends from a center part of the base portion 4, it is almost the same as the first and second embodiments.

On the contrary, a fixed member 10 is provided with four abutting members 16 placed corresponding to the four supporting bars 8 placed in an abutting portion such that four sides of a quadrangle are formed. In the abutting members 16, a curved concave portion corresponding to an outline of the supporting bars 8 is formed. Accordingly, the base portion 4 can incline smoothly.

The probe 30 according to this embodiment further includes a rotary joint 22 placed at a center area (under the shaft portion 2) of the base portion 4, and a supporting shaft 24 connected to the rotary joint 22. The supporting shaft 24 is rotatably connected to the base portion 4 by the rotary joint 22. Accordingly, when the base portion 4 inclines due to contact with an object, the supporting shaft 24 moves downwards. In this embodiment, the supporting shaft 24 is supported such that it can move up and down smoothly by a guide 28 having a sliding bearing provided in a base 26 connected to a body of the probe 30.

The following symbol is applied:
$\ominus$: an inclination angle of the base portion (Drawing shows as an inclination angle of the shaft portion)
D: a distance between the rotational center for inclination and the center part of the base portion 4.

According to the inclination of the base portion 4, the supporting shaft 24 moves downwards by the distance of $D \times \sin \ominus$.

In the probe 30 according to this embodiment, a magnet is provided in the supporting shaft 24, and a non-contact sensor 32 is provided along the supporting shaft 24 having the magnet. As the non-contact sensor 32 used in this embodiment, a sensor using a magneto resistive effect element is exemplified. Since a movement of the magnet provided in the supporting shaft 24 can be detected, a displacement of the supporting shaft 24 can be detected precisely.

As mentioned above, in this embodiment, since the supporting shaft 24 is rotatably connected to the base portion 4, an inclination angle of the base portion 4 can be converted into a displacement of the supporting shaft 24. Accordingly, a precise measurement can be achieved without using a costly sensor. Since the sensor 32 can be placed efficiently, a compact probe can be obtained. Further, since even if the base portion 4 inclines in any direction, the supporting shaft 24 moves up and down similarly, a precise measurement can always be achieved in spite of a contact direction with an object.

In the third embodiment that the abutting member 16 in which the curved concave portion is formed is provided, to be similar to the above-mentioned alternative example, it is possible to have a clearance between the supporting bar 8 and the abutting member 16 in the initial state that the shaft portion 2 does not contact an object.

Further, the rotary joint 22, supporting shaft 24 and the sensor 32 which measures a displacement of the supporting shaft 24 according to the third embodiment can be incorporated into the probe 30 according to the first or second embodiment.

(Description of Other Embodiment)

In the above-mentioned embodiments, the four supporting bars are placed in at least one of the base portion side and the fixed portion side such that four sides of a quadrangle are formed. Therefore, contact with an object in the four directions can be detected. However, it is not limited thereto, and for example, it is possible to provide supporting bars such that sides of a hexagon or an octagon are formed.

In a detecting device according to the present disclosure, if N pieces of supporting bars are provided such that sides of an N-sided polygon are formed in at least one of the base portion and the fixed portion, and the point contact at two or more points or the line contact is obtained in each supporting bar, a contact with an object in N directions can be detected (N: Integer number of 3 or more). In this case, if N is an even number, it is preferable because contact with an object from both sides can be detected.

The present disclosure includes a case that a rotational center for inclination is formed by the point contact with the pin & pin between a base portion and a fixed portion. However, in a view point such that a position of a base portion can be determined easily, it is preferable to provide a supporting bar in at least one of the base portion and the fixed portion.

While the embodiments and the aspects of the present disclosure has been described, contents of the disclosure may be varied in details of the configuration, and a combination of elements and a change of order in the embodiments or the aspects may be realized without deviating from the scope of the claims and the concepts of the present disclosure.

The invention claimed is:

1. A detecting device which detects contact with an object, comprising;
    a fixed portion provided in the detecting device,
    a shaft portion and a base portion connected to the shaft portion, the base portion configured to move relative to the fixed portion,
    a sensor which measures a displacement resulting from an inclination of the base portion relative to the fixed portion caused by contact between an object and the shaft portion,
    a control portion which determines if contact between an object and the shaft portion occurs or not based on the measured displacement, and
    a fixed member provided in the fixed portion, the fixed member abutting the base portion in a state that the shaft portion contacts an object,
    wherein the shaft portion is placed between an abutting part of the fixed member with the base portion and an object,
    wherein the base portion inclines relative to the fixed portion around an abutting portion of the base portion with the fixed member as a rotation center for inclination,
    wherein the base portion and the fixed member are apart from each other in a state that the shaft portion does not contact an object, and
    wherein the base portion moves and then abuts the fixed member by a pressing force from an object which contacts the shaft portion.

2. The detecting device according to claim 1, further comprising;
    a supporting bar rotatably connected to the base portion,
    wherein the sensor measures a displacement of the supporting bar resulting from an inclination of the base portion.

3. The detecting device according to claim 1,
    wherein four supporting bars are placed at the abutting portion of the base portion such that four sides of a quadrangle are formed.

4. The detecting device according to claim 3,
    wherein the fixed member is configured with four fixed portion side supporting bars which are placed corresponding to the four supporting bars placed on the abutting portion of the base portion such that four sides of a quadrangle are formed, and
    wherein the base portion inclines relative to the fixed portion by a pressing force from an object due to a contact between the shaft portion and an object, thereby making one of the four supporting bars placed at the abutting portion come into line contact with one of the four fixed portion side supporting bars which configures the fixed member.

5. The detecting device according to claim 1,
    wherein pins for determining a position of the base portion in a state that the base portion does not incline relative to the fixed portion are provided on a surface of the fixed portion such that the pins correspond to corners of the quadrangle formed by the four supporting bars placed at the abutting portion, and
    wherein the pins are placed closer to the shaft portion than the four supporting bars, and incline to the shaft portion side relative to a center axis of the shaft portion.

6. A detecting device which detects contact with an object, comprising;
    a fixed portion provided in the detecting device,
    a shaft portion and a base portion connected to the shaft portion, the base portion configured to move relative to the fixed portion,
    a sensor which measures a displacement resulting from an inclination of the base portion relative to the fixed portion caused by contact between an object and the shaft portion, and
    a control portion which determines if contact between an object and the shaft portion occurs or not based on the measured displacement, and
    a fixed member provided in the fixed portion, the fixed member abutting the base portion in a state that the shaft portion contacts an object,
    wherein the shaft portion is placed between an abutting part of the fixed member with the base portion and an object, and
    wherein the base portion inclines relative to the fixed portion around an abutting portion of the base portion with the fixed member as a rotation center for inclination, and
    wherein four supporting bars are placed at the abutting portion of the base portion such that four sides of a quadrangle are formed.

7. The detecting device according to claim 6, further comprising;
    a supporting bar rotatably connected to the base portion,
    wherein the sensor measures a displacement of the supporting bar resulting from an inclination of the base portion.

8. The detecting device according to claim 6,
    wherein the fixed member is configured with four fixed portion side supporting bars which are placed corresponding to the four supporting bars placed on the abutting portion of the base portion such that four sides of a quadrangle are formed, and wherein the base portion inclines relative to the fixed portion by a pressing force from an object due to a contact between the shaft portion and an object, thereby making one of the four supporting bars placed at the abutting portion come into line contact with one of the four fixed portion side supporting bars which configures the fixed member.

9. The detecting device according to claim 6, wherein pins for determining a position of the base portion in a state that the base portion does not incline relative to the fixed portion are provided on a surface of the fixed portion such that the pins correspond to corners of the quadrangle formed by the four supporting bars placed at the abutting portion, and wherein the pins are placed closer to the shaft portion than the four supporting bars, and incline to the shaft portion side relative to a center axis of the shaft portion.

* * * * *